Aug. 23, 1960

F. HAALCK 2,950,434

CALIBRATION OF TORSION MAGNETOMETERS

Filed Aug. 21, 1958

INVENTOR.
Fritz Haalck
BY
Samuel W. Kipnis.
Atty.

United States Patent Office 2,950,434
Patented Aug. 23, 1960

2,950,434

CALIBRATION OF TORSION MAGNETOMETERS

Fritz Haalck, Berlin-Wilmersdorf, Germany, assignor to Askania-Werke A.G., Berlin-Friedenau, Germany, a corporation of Germany Filed Aug. 21, 1958, Ser. No. 756,325

Claims priority, application Germany Aug. 23, 1957

3 Claims. (Cl. 324—48)

This invention relates to means for and a method of calibration of torsion type magnetometers. Hitherto such calibration has been effected—both incident to manufacture and in the field (recalibration)—by means of a pair of wire coils coaxially associated with one another and having the magnetometer magnet therebetween. Although such coils allow accurate calibration, their use is inconvenient, mainly in the field, since it requires provision of batteries and sensitive electrical measuring devices. Other proposals have therefore been made, including one involving the use of auxiliary magnets, which however involved such extreme difficulties in transportation and operation that the coil method, in spite of its inconvenience, has been prevailing thus far.

It has been an object of the invention to eliminate such inconvenience of calibration and indeed, a way has now been found to do so and to calibrate torsion magnetometers by the mere use of instrument constants and markers and of an approximate determination of a certain component of the geomagnetic field.

The nature of said instrument constants and markers will be explained presently. For this purpose, and for an explanation of said certain component it will be convenient to utilize herein a concept of a "complementary component," which is defined as follows: where the instrument serves to determine the vertical component (Z) of the geomagnetic field, the horizontal component (H) is the complementary one, and vice versa. On the basis of this definition the new method may generally be described by the characteristic that the magnet system of the instrument is subjected to inclination or declination angles predetermined by and marked on the instrument itself, in a way such that said angles as measured at the manipulating end of the torsion system, the corresponding torsion angles, and the approximate complementary component yield the calibration constant of the instrument.

Figure 1:
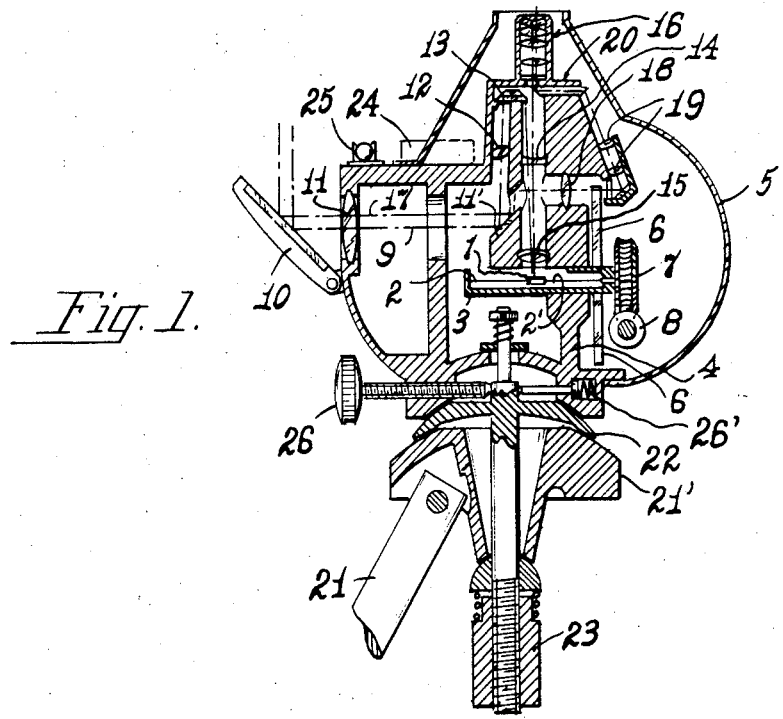
Figure 2:
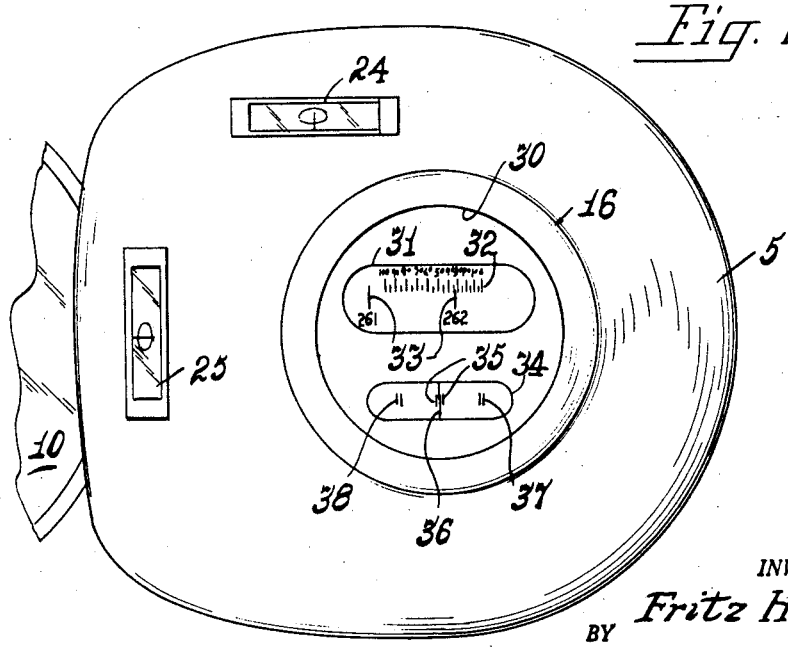

This will be understood more fully on consideration of a preferred embodiment of the new calibration means and operations, as applied to a basically known magnetometer device. Such means and device are shown in the drawing, wherein Figure 1 is a vertical, central section through the instrument and Figure 2 is an enlarged detail from a plan view thereof.

The measuring magnet 1, having a mirror surface thereon, is suspended between two horizontal torsion filaments 2 and 2', the outer ends of which are fastened in a U-shaped carrier 3 rotatably journaled in a stationary structure 4 within instrument housing 5. Carrier or frame 3 is rigid with a graduated circle 6 for observing rotations of the frame (angles as measured at the manipulating end), said rotations providing torsion moments which by means of the filaments are transmitted to the magnet exposed to the geomagnetic field. The rotation is manually performed by means of gears 7, 8.

A light beam 9 is directed by reflector 10 and optical elements 11, 11', 12, 13, 14 and 15 to the mirror surface of magnet 1 and further to ocular 16, these elements forming an autocollimation system as known for instance from Patent 2,629,003. An additional light beam 17 illuminates, via lens 18, a peripheral portion of circle 6 where the graduation to be read is formed as a mark, the circle being transparent and the mark opaque so that the image of the reading point can be observed, via imaging elements 19, 20, in the field of view of reading microscope 16.

Instrument housing 5 is mounted on tripod 21 by spherical members 21', 22. It can be fastened by knurled nut 23, or, when such nut is loosened, spherical members 21', 22 can be shifted relative to one another, for coarse levelling, whereafter the nut is fastened again. Fine levelling of the instrument is then performed, until spirit levels 24, 25 show horizontal position, by operation of a screw 26 bearing against a resilient member 26' via a central portion of housing 5, and by additional operation of a second screw, not shown, which is normal to 26.

The invention, as initially stated, serves to facilitate calibration. In other words it serves to determine, or redetermine, the constant $k$ in the formula $\Delta Z = K\varphi$, wherein $\varphi$ is the torsion angle as manipulated at 6, 7, 8, $\Delta Z$ is an increment or change of field strength, and K is the constant showing and determining the relation of such change to such torsion angle, which constant is to be determined. The determination of the torsion angle is made in the way more fully described in said earlier patent. The way in which the calibration constant is determined will now be explained.

When the instrument has been placed in horizontal position so that the torsion filaments are horizontal and if the magnet lies in a horizontal plane, equilibrium of the magnetic system is established when $$M.Z + m.g.l. \cos \delta = \tau + (\varphi + \varphi_0) \qquad (A)$$

wherein M is the magnetic moment of the magnet system, $m$ is the mass thereof, considered as a point mass concentrated at the center of gravity thereof, $l$ is the distance from such center of gravity to the filament axis, $\delta$ is the angle included between the direction of moment M and the direction of the normal through the center of gravity to the filament axis, $\tau$ is the torsion constant of the filaments, $\varphi_0$ is the preexisting torsion of the filaments and $\varphi$ is the torsion angle proper. It is further known from theory that $$Z = \frac{\tau}{M} \Delta \varphi \qquad (B)$$

Assuming further that the plane of rotation of magnet system 1 includes the geomagnetic meridian of the point of observation, that torsion $\varphi$ is applied and that it rotates the magnet system by angle $\alpha$ from the horizontal, equilibrium is reestablished when $$M.Z \cos \alpha - M.H \sin \alpha + mgl \cos (\delta - \alpha) = \tau(\varphi_1 + \varphi_0) \qquad (C)$$

and in the case of negative rotation $(-\alpha)$, when $$M.Z \cos \alpha + M.H \sin \alpha + mgl \cos (\delta + \alpha) = \tau(\varphi_2 + \varphi_0) \qquad (D)$$

it being understood that $\varphi_2$ is the torsion effecting rotation $-\alpha$.

By use of Equations A to D it is found that $$\frac{\tau}{M} = K = -\frac{2H \sin \alpha}{(\varphi_1 - \varphi_2)} + \frac{mgl \sin \delta \sin \alpha}{M(\varphi_1 - \varphi_2)} \qquad (E)$$

in other words that the calibration constant K depends, if $\alpha$ is known, exclusively on H, $\varphi_1$ and $\varphi_2$ and other instrument constants. Practically the addend in Equation E is small enough to be disregarded so that the constant can be equated with the augend, i.e.

$$K = -\frac{2H \sin \alpha}{(\varphi_1 - \varphi_2)} \quad (F)$$

It will further be found that in practically all actual cases H will be known to a sufficient extent to determine K with sufficient precision. In Central Europe H must be known to a tolerance of about plus or minus one hundred gamma in order to determine K with tolerances of plus or minus .5%. Such approximate values of H are generally available as a matter of course, so that the calibration depends only on the manipulated angles $\varphi_1$ and $\varphi_2$ and the observable angle $\alpha$.

It is therefore merely required for apparatus according to this invention that the manipulated angle—be it one for inclination, as in the illustrated device, or for declination—may be determined, along with the observed angle of magnet deflection. Such determination is possible in the most various ways and generally by means of utmost simplicity. For instance, Figure 2 shows such means. Field of view 30 of microscope 16 contains not only area 31 for reading and interpolating, by fixed scale 32, a movable scale 33 of circle 6; said field also contains area 34 for magnet observation and in the latter area, not only fixed marks 35 for normal null observation of the projected image 36 of magnet light beam 9 but also a further pair of fixed marks 37, 38 so spaced from 35 as to indicate, when 36 coincides with 37 or 38, that magnet 1 has been rotated through a certain angle $\alpha$ or $-\alpha$. It will be realized that the angularity of magnet movement relates to the fixed distance 35—37 or 35—38 in predetermined and unalterable way, dependent mainly on optics 12 to 16.

Numerous modifications are possible. For instance, in lieu of a double mark 37 there can be used either a single mark, or a plurality of marks or scale, or a stop device, or in case of declination instruments, a suitably modified system of marks, or of course some means of direct observation, as widely known in case of dipping needles, which however will generally be much less precise. It is understood that scale marks and scales are of course known, per se and in many other instruments, including also other magnetometers. It is however believed to be new to use scale marks 37, 38 or equivalent in the here explained ways, in magnetometer basically operating according to the null system with respect to the magnet.

I claim:

1. In a magnetometer, a torsion system having a manually rotatable part; means for manual rotation of said part; means for observing such rotation; a magnet suspended on said system and adapted by said rotation normally to be returned after magnetic deflections to a null position; means for observing such return, the latter means including an indicator area, a device for moving an indicator over said area in response to said magnetic deflections and to said returning of the magnet, and a null position index for the indicator, said index being disposed in said area; and means for calibrating the torsion system and magnet, said latter means comprising a pair of deflection indices disposed in said area, symmetrically spaced from the null position index, whereby observable manual rotations of said rotatable part allow return of the indicator to at least one of said deflection indices, furnishing a calibration value, while also allowing return of the indicator to the null position index, furnishing a magnetometer reading.

2. Magnetometer according to claim 1 wherein each of said deflection indices comprises a pair of closely spaced markers.

3. Calibration method for torsion magnetometers of the type having a null position indicator area, said method including the steps of orienting the magnetometer for measurement of the component to be measured; thereupon manually effecting a rotation of the manually rotatable part of the torsion system of the magnetometer by a known amount; and measuring the then resulting amount of rotation of the magnet of the magnetometer, in said area, for computing from such amounts, together with an approximate value of the complementary component, the calibration constant of the torsion system and magnet.

References Cited in the file of this patent
UNITED STATES PATENTS 2,629,003     Haalck _____ Feb. 17, 1953